(12) United States Patent
Pike et al.

(10) Patent No.: US 7,644,219 B2
(45) Date of Patent: Jan. 5, 2010

(54) SYSTEM AND METHOD FOR MANAGING THE SHARING OF PCI DEVICES ACROSS MULTIPLE HOST OPERATING SYSTEMS

(75) Inventors: Jimmy D. Pike, Georgetown, TX (US); Richard W. Schuckle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 11/171,980

(22) Filed: Jun. 30, 2005

(65) Prior Publication Data

US 2007/0005866 A1    Jan. 4, 2007

(51) Int. Cl.
   *G06F 13/36* (2006.01)
(52) U.S. Cl. ............. 710/306; 710/305; 710/240; 710/107
(58) Field of Classification Search ......... 710/301–306, 710/104, 100, 107, 240; 711/154
   See application file for complete search history.

(56) References Cited

U.S. PATENT DOCUMENTS

| | | | |
|---|---|---|---|
| 6,360,291 | B1 | 3/2002 | Tavallaei |
| 6,792,490 | B2 | 9/2004 | Tavallaei |
| 6,826,703 | B2 * | 11/2004 | Kawano et al. ............. 713/320 |
| 7,181,578 | B1 * | 2/2007 | Guha et al. .................. 711/154 |
| 7,457,906 | B2 * | 11/2008 | Pettey et al. ................. 710/316 |
| 2002/0016877 | A1 * | 2/2002 | Porterfield ................... 710/100 |
| 2002/0152344 | A1 * | 10/2002 | Holm et al. .................. 710/260 |
| 2003/0005207 | A1 * | 1/2003 | Langendorf et al. .......... 710/306 |
| 2003/0093604 | A1 * | 5/2003 | Lee ............................. 710/302 |
| 2004/0181657 | A1 * | 9/2004 | Armstrong et al. ............. 713/1 |
| 2005/0044277 | A1 * | 2/2005 | Zilavy ............................. 710/1 |
| 2005/0177648 | A1 * | 8/2005 | Toyohara et al. ............... 710/1 |
| 2005/0246460 | A1 * | 11/2005 | Stufflebeam ................. 710/104 |
| 2006/0036796 | A1 * | 2/2006 | Riley ........................... 710/306 |
| 2006/0092928 | A1 | 5/2006 | Pike et al. |

* cited by examiner

*Primary Examiner*—Khanh Dang
*Assistant Examiner*—Kim T Huynh
(74) *Attorney, Agent, or Firm*—Baker Botts L.L.P.

(57) ABSTRACT

A system and method is disclosed for initializing PCI devices in a computer system or information handling system. Upon initialization of the system, each operating system instance of the system attempts to access a PCI bridge device. The first operating system to access the bridge device is granted ownership of the bridge device and the authority to initialize each PCI device coupled to the bridge device. The bridge device assigns each operating system to at least one context included in at least one of the PCI devices. After each of the PCI devices has been initialized, a configuration event is issued with respect to each operating system instance and each assigned PCI device, thereby causing each operating system to recognize each PCI device assigned to each respective operating system instance.

20 Claims, 2 Drawing Sheets

SYSTEM AND METHOD FOR MANAGING THE SHARING OF PCI DEVICES ACROSS MULTIPLE HOST OPERATING SYSTEMS

TECHNICAL FIELD

The present disclosure relates generally to computer systems and information handling systems, and, more particularly, to a system and method for managing the sharing of PCI devices across multiple host operating systems.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a bus that operates according to the Peripheral Component Interconnect (PCI) specification. Peripheral Component Interconnect is a bus between the processor and attached devices in an information handling system. PCI Express is an expansion of the PCI specification. As compared with the original PCI standards, PCI Express provides for an expansion of the width of the bus and a higher bus clock rate. As compared with a shared bus topology, PCI Express uses a point-to-point bus topology. As a result, a bridge device or controller functions as a switch to direct communications between a host and a PCI device. In a typical PCI Express architecture, however, a PCI device may only be addressable by a single host operating system. As such, in a computer system architecture that includes multiple hosts, a PCI device could not be shared by the multiple hosts of the computer system.

SUMMARY

In accordance with the present disclosure, a system and method is disclosed for initializing PCI devices in a computer system or information handling system. Upon initialization of the system, each operating system instance of the system attempts to access a PCI bridge device. The first operating system to access the bridge device is granted ownership of the bridge device and the authority to initialize each PCI device coupled to the bridge device. The bridge device assigns each operating system to at least one context included in at least one of the PCI devices. In some configurations, each operating system instance will be assigned to a context in each of the PCI devices. After each of the PCI devices has been initialized, a PCI hot plug event is issued with respect to each operating system instance and each assigned PCI device, thereby causing each operating system to recognize each PCI device assigned to each respective operating system instance.

The system and method disclosed herein is technically advantageous because it provides a methodology for sharing PCI devices among the multiple operating systems of a computer system. Each operating system is assigned a unique context in a PCI device. The system and method disclosed herein provides a methodology for initializing the shared PCI devices within the existing programming model of the computer system. As such, the system and method disclosed herein provides for the initialization of shared PCI devices, without the necessity of adding an additional layer of programming to the PCI programming model. Following the execution of the system and method disclosed herein, the PCI devices are initialized for sharing among the multiple operating system instances in a manner that is transparent to the operating system instances.

Another technical advantage of the system and method disclosed herein is that the methodology provides for the initialization of PCI devices by a single operating system instance, without introducing the configuration inconsistencies that could be introduced if each of the multiple operating system instances attempted to initialize each of the PCI devices of the computer system. The system and method disclosed herein is advantageous because any of the operating system instances of the computer system can perform the task of initializing the PCI devices of the computer system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
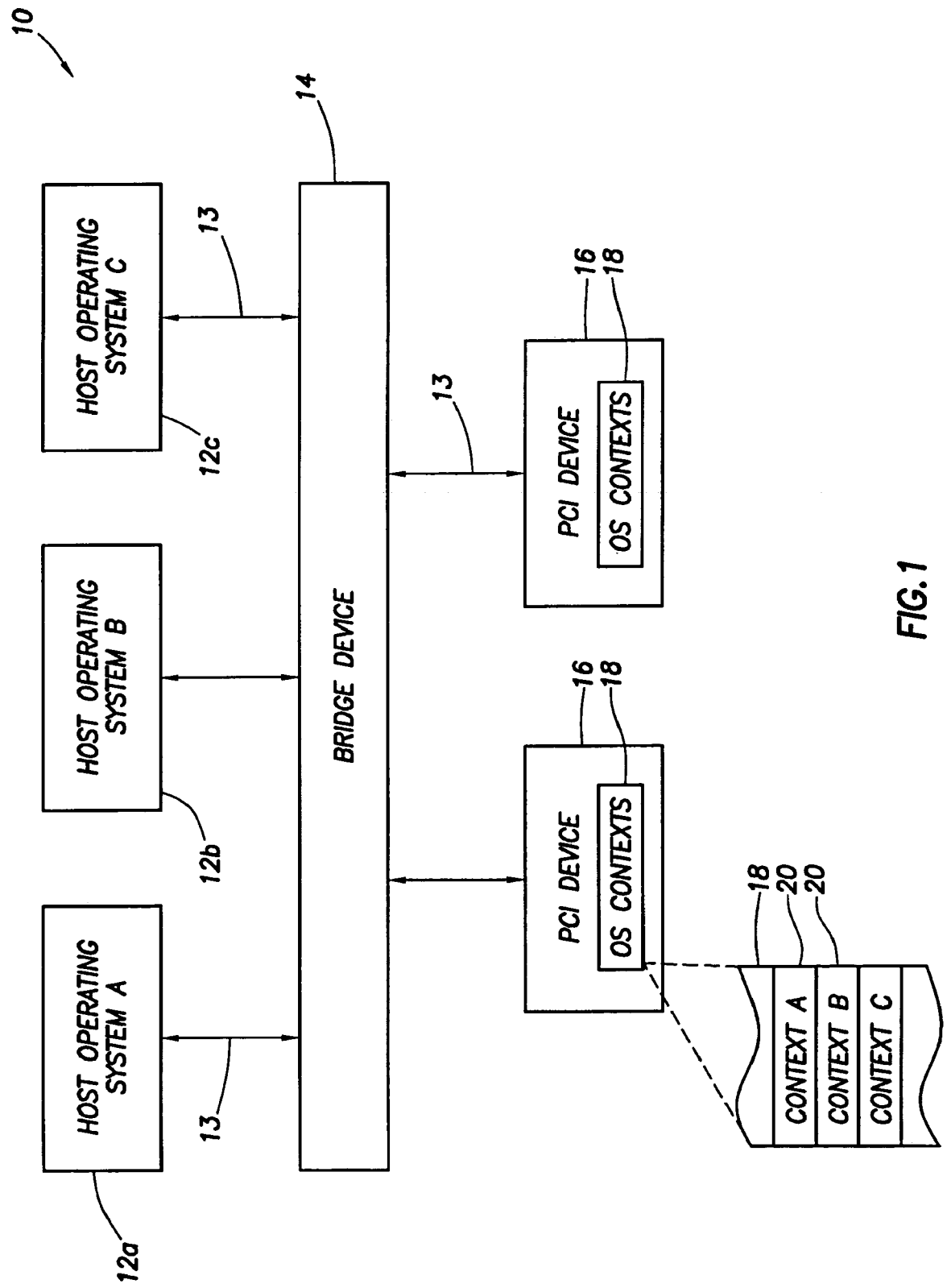
FIG. 1 is an architecture and topology diagram of a computer system or information handling system.

Shown in FIG. 1 is an architecture and topology diagram of a computer system or information handling system. The computer system of claim 1, which is indicated generally at 10, includes multiple host operating systems 12. Each of the host operating systems 12 may reside on a separate processor, as could be the case in a multiprocessor computer system. Each host operating system may, for example, be associated with a single server computer, such as a blade server. Alternatively, multiple of the instances of the host operating systems may reside and execute on a single processor, as in the case of a single processor that has been partitioned to execute multiple instances of a host operating system. Each host operating system 12 is coupled by a PCI bus 13 to a PCI bridge device 14. Bridge device 14 may also be referred to or denominated as a PCI switch, PCI controller, or south bridge. The switch terminology is used with respect to PCI Express terminology, even though the device behaves like a logical bridge. Bridge device 14 may be included as part of the chip set of the computer system. The function of bridge device 14 is to route communications from a host to a target PCI device. The bridge device is coupled through a PCI bus 13 to multiple PCI devices 16. As indicated in by the topology shown of FIG. 1, the PCI bus connections in FIG. 1 are point-to-point connections.

Each PCI device 16 includes a number of host operating system contexts, which are identified at 18. Each host operating system context is associated with a single host operating system. Each context comprises a set of control registers and other programming information that is dedicated for use by a single host operating system. Each context is associated exclusively with a single PCI device and a host operating system. A depiction of a set of contexts is indicated at data structure 18, which includes a set of contexts 20.

Figure 2:
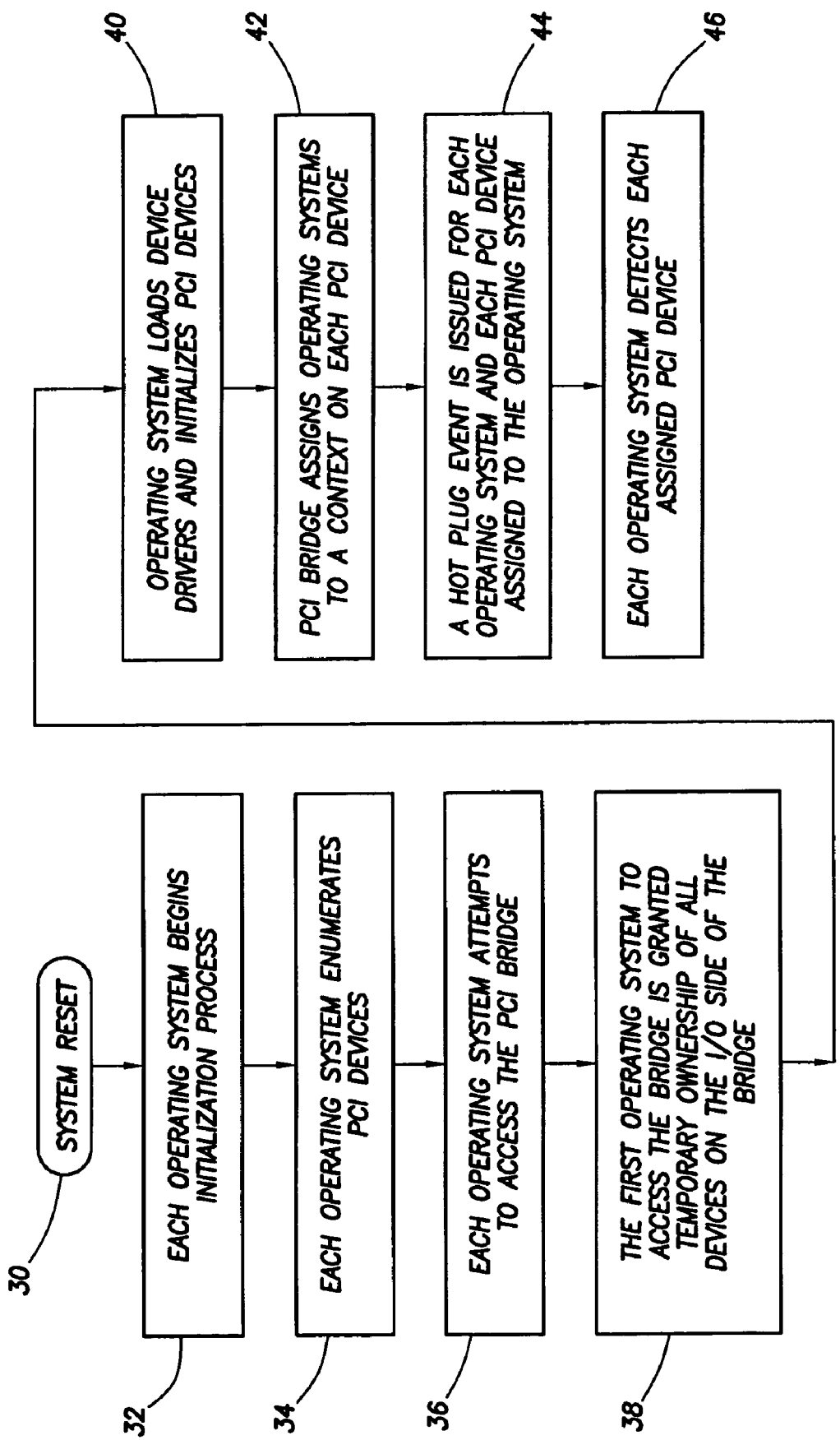
FIG. 2 is a flow diagram of a method for initializing a computer system that includes multiple host operating systems and multiple PCI devices.

FIG. 2 is a flow diagram of a method for initializing a computer system that includes multiple host operating systems and multiple PCI devices in a PCI Express architecture. At step 30, the computer system is reset. Following the reset of the computer system, each host operating system at step 32 begins its initialization process. As part of the initialization process, each of the host operating systems will being a PCI device enumeration process at step 34, which involves each host operating system identifying the PCI devices that are accessible by the host operating system. As part of this enumeration process, each host operating system will recognize that the computer system includes a PCI bridge, which indicates that one or more PCI devices may be on the I/O side of the bridge. At step 36, each host operating systems contends for exclusive ownership of the PCI bridge, and, at step 38, the first host operating system to actually attempt to access the bridge is granted ownership of the bridge, including ownership of the right to access all PCI devices on the I/O side of the bridge. During the period that the first host operating system to access the bridge is in possession of the bridge, the other host operating systems of the computer system are not able to detect the PCI devices on the I/O side of the PCI bridge, and these other host operating systems do not perform any configuration activity.

At step 40, the host operating system that has acquired ownership of the PCI bridge loads device drivers for each of the PCI devices and initializes each PCI device on the I/O side of the PCI bridge. The host operating system next assigns within the PCI bridge a context within each PCI device to each host operating system. As a result of this assignment, each host operating system allocated a unique programming environment within each of the PCI devices of the computer system. The methods for assigning contexts to host operating systems and for communicating with a PCI device on the basis of an assigned context is described in U.S. application Ser. No. 10/966,293, titled "System and Method for Providing a Shareable Input/Output Device in a PCI Express Environment," which was filed Oct. 15, 2004 and is incorporated herein by reference in its entirety. Following step 42, each host operating system is uniquely assigned to a context in each of the PCI devices. Following step 42, the host operating system that acquired ownership of the PCI bridge releases ownership over the PCI bridge.

At step 44, the PCI bridge issues a hot plug event for each host operating system and each PCI device assigned to the host operating system. As a result of the each issuance of the hot plug events, each host operating system detects the PCI devices, and the contexts, within the PCI devices, that have been assigned to the host operating system. A hot plug event is a configuration event that causes each host operating system to recognize the PCI devices assigned to it in much the same fashion as a hot add during normal PCI Express operation. At step 46, as part of the detection of each PCI device (and the associated context) assigned to each host operating system, the host operating system loads the appropriate drives for the PCI device and is able to use the PCI device.

As a result of the system and method disclosed herein, the host operating systems of a computer system can be configured such that each host operating system is specifically assigned to a single context in each PCI device. The system and method described herein may be employed without modification to the operation of host operating system. Each host operating system performs and functions without modification. The system and method described herein may be accomplished by the execution of a routine or utility executing in the PCI bridge. The routine or utility recognizes the first host operating system to access the bridge and employs that host operating system for the task of initiating each PCI device. After the utility in the PCI bridge device has assigned each operating system to a single context in the PCI devices, the utility issues a hot plug event to cause each respective host operating system to recognize those PCI devices assigned to it. As such, the system and method described herein may be performed with existing host operating systems and under the existing PCI Express protocol, and with the addition of a utility, which may be downloaded and installed in the PCI bridge. In addition, the system and method disclosed herein may be implemented without the necessity of adding a synchronization layer or synchronization utility with each processor and host operating system.

It should be recognized that the system and method disclosed herein may be performed with respect to any PCI device, including any PCI-X or PCI Express device. Although the present disclosure has been described in detail, it should be understood that various changes, substitutions, and alterations can be made hereto without departing from the spirit and the scope of the invention as defined by the appended claims.

What is claimed is:

1. A method for initializing PCI devices communicatively coupled to a bridge device in an information handling system that includes multiple operating system instances, comprising:

resetting the information handling system;

identifying the operating system instance that is the first to access the bridge device and granting ownership of the bridge device to the identified operating system instance;

permitting the operating system instance that is the first to access the bridge device the authority to initialize each of the PCI devices;

assigning each operating system instance of the information handling system to at least one context in at least one of the PCI devices;

wherein assigning an operating system instance to at least one context in at least one of the PCI devices comprises allocating a unique programming environment to the operating system instance within the at least one of the PCI devices;

releasing ownership by the identified operating system instance of the bridge device; and causing a configuration event for each context of each PCI device to cause each operating system instance to detect each PCI device assigned to the operating system.

2. The method for initializing PCI devices of claim 1, wherein each operating system instance of the information handling system is assigned to a context in each of the PCI devices.

3. The method for initializing PCI devices of claim 2, wherein the issuance of the configuration event causes each operating system instance to detect each PCI device of the information handling system.

4. The method for initializing PCI devices of claim 1, further comprising the step of performing an enumeration process at each operating system instance for the PCI devices of the information handling system.

5. The method for initializing PCI devices of claim 1, wherein the step of causing a configuration event comprises the step of causing the initiation of a hot plug event to cause each operating system instance to detect each PCI device assigned to the operating system instance.

6. The method for initializing PCI devices of claim 5, wherein each operating system instance of the information handling system is assigned to a context in each of the PCI devices.

7. The method for initializing PCI devices of claim 6, wherein the issuance of the hot plug event causes each operating system instance to detect each PCI device of the information handling system.

8. The method for initializing PCI devices of claim 1, wherein the step of permitting the first operating system instance to initialize each of the PCI devices comprises the step of granting the operating system instance that is the first to access the bridge device the ownership of the bridge device to the exclusion of the other operating system instances of the information handling system.

9. An information handling system, comprising:
multiple operating system instances;
a PCI bridge accessible by each of the operating system instances; and
multiple PCI devices coupled to the PCI bridge;
wherein, upon a reset of the information handling system, the PCI bridge is operable to:
permit the operating system instance that is the first to access the bridge device the authority to initialize each of the PCI devices and granting ownership of the bridge device to the identified operating system instance;
assign each operating system instance of the information handling system to at least one context in at least one of the PCI devices;
wherein assigning an operating system instance to at least one context in at least one of the PCI devices comprises allocating a unique programming environment to the operating system instance within the at least one of the PCI devices; and
release ownership by the identified operating system instance of the bridge device; and
cause a configuration event for each context of each PCI device to cause each operating system instance to detect each PCI device assigned to the operating system instance.

10. The information handling system of claim 9, wherein the PCI bridge device is operable to assign each operating system instance of the information handling system to a context in each of the PCI devices.

11. The information handling system of claim 10, wherein the issuance of a configuration event by the bridge device causes each operating system instance to detect each PCI device of the information handling system.

12. The information handling system of claim 9, wherein the PCI bridge device is operable to issue a configuration event by causing the initiation of a hot plug event to cause each operating system instance to detect each PCI device assigned to the operating system instance.

13. The information handling system of claim 12, wherein the PCI bridge device is operable to assign each operating system instance of the information handling system to a context in each of the PCI devices.

14. The information handling system of claim 13, wherein the issuance of a hot plug event by the bridge device causes each operating system instance to detect each PCI device of the information handling system.

15. The information handling system of claim 9, wherein the PCI bridge device is operable to grant the operating system instance that is the first to access the bridge device the ownership of the bridge device to the exclusion of the other operating system instances of the information handling system.

16. A method for initializing the PCI devices in a computer system that includes multiple operating system instances and a bridge device, comprising the steps of:
identifying the operating system instance that is the first to access the bridge device following a reset of the computer system;
granting ownership of the bridge device to the operating system instance that was the first to access the bridge device;
permitting the operating system instance that was the first to access the bridge device the authority to initialize each of the PCI devices and granting ownership of the bridge device to the identified operating system instance;
assigning each operating system instance of the computer system to at least one context in at least one of the PCI devices;
wherein assigning an operating system instance to at least one context in at least one of the PCI devices comprises allocating a unique programming environment to the operating system instance within the at least one of the PCI devices;
releasing ownership by the identified operating system instance of the bridge device; and
causing a configuration event for each context of each PCI device to cause each operating system instance to detect each PCI device assigned to the operating system instance.

17. The method for initializing the PCI devices of a computer system of claim 16, wherein each operating system instance of the computer system is assigned to a context in each of the PCI devices.

18. The method for initializing the PCI devices of a computer system of claim 17, wherein the issuance of the configuration event causes each operating system instance to detect each PCI device of the computer system.

19. The method for initializing the PCI devices of a computer system of claim 16, wherein the step of causing a configuration event comprises the step of causing the initiation of a hot plug event to cause each operating system instance to detect each PCI device assigned to the operating system instance.

20. The method for initializing the PCI devices of a computer system of claim 19, wherein each operating system instance of the computer system is assigned to a context in each of the PCI devices, and wherein the issuance of the hot plug event causes each operating system instance to detect each PCI device of the computer system.

* * * * *

UNITED STATES PATENT AND TRADEMARK OFFICE
CERTIFICATE OF CORRECTION

| | | |
|---|---|---|
| PATENT NO. | : 7,644,219 B2 | Page 1 of 1 |
| APPLICATION NO. | : 11/171980 | |
| DATED | : January 5, 2010 | |
| INVENTOR(S) | : Pike et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 146 days.

Signed and Sealed this

Twenty-first Day of December, 2010

David J. Kappos
*Director of the United States Patent and Trademark Office*